US006958310B2

(12) United States Patent
Wang et al.

(10) Patent No.: US 6,958,310 B2
(45) Date of Patent: Oct. 25, 2005

(54) CATALYST AND METHOD OF STEAM REFORMING

(75) Inventors: Yong Wang, Richland, WA (US); Anna Lee Y. Tonkovich, Marysville, OH (US); David P. Vanderwiel, Columbus, OH (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/394,866

(22) Filed: Mar. 24, 2003

(65) Prior Publication Data

US 2003/0185750 A1 Oct. 2, 2003

Related U.S. Application Data

(60) Division of application No. 09/788,293, filed on Feb. 16, 2001, now Pat. No. 6,607,678, which is a continuation-in-part of application No. 09/375,615, filed on Aug. 17, 1999, now Pat. No. 6,284,217, and a continuation-in-part of application No. 09/640,903, filed on Aug. 16, 2000, and a continuation-in-part of application No. 09/375,614, filed on Aug. 17, 1999, now Pat. No. 6,488,838.

(51) Int. Cl.[7] .......................... B01J 23/00; B01J 23/40; B01J 23/42; B01J 23/58; B01J 20/00
(52) U.S. Cl. ...................... 502/327; 502/328; 502/332; 502/333; 502/334; 502/335; 502/337; 502/339; 502/527.12; 502/355; 502/415; 502/439
(58) Field of Search .............................. 502/177, 322, 502/327, 328, 332–335, 337, 339, 341, 524, 527.12, 527.24, 355, 415, 439

(56) References Cited

U.S. PATENT DOCUMENTS

| 3,304,153 | A |   | 2/1967  | Bakker et al. ................ 23/52    |
| 3,530,209 | A |   | 9/1970  | Ho .............................. 264/65 |
| 3,865,750 | A | * | 2/1975  | Rase et al. ................... 502/177  |
| RE28,655  | E |   | 12/1975 | Rostrup-Nielson .......... 252/466       |
| 3,926,583 | A |   | 12/1975 | Rostrup-Nielson ........... 48/214       |
| 4,088,608 | A |   | 5/1978  | Tanaka et al. .............. 252/466     |
| 4,298,462 | A | * | 11/1981 | Antos ......................... 208/139   |
| 4,316,822 | A | * | 2/1982  | Fujitani et al. ............. 502/304    |
| 4,367,162 | A | * | 1/1983  | Fujitani et al. ............. 502/178    |
| 4,407,733 | A | * | 10/1983 | Birkenstock et al. ....... 502/174      |
| 4,414,140 | A |   | 11/1983 | Setzer ....................... 502/303    |
| 5,017,541 | A | * | 5/1991  | Schmidt et al. ............. 502/169     |
| 5,137,774 | A | * | 8/1992  | Ruppi ........................ 428/216    |
| 5,204,302 | A |   | 4/1993  | Gorynin et al. ............... 502/2     |
| 5,422,331 | A |   | 6/1995  | Galligan et al. ............. 502/333    |
| 5,463,161 | A | * | 10/1995 | Gajda et al. ................ 585/671    |
| 5,679,614 | A |   | 10/1997 | Bangala et al. ............. 502/302     |
| 5,728,358 | A |   | 3/1998  | Avidan et al. .............. 423/244     |
| 5,741,469 | A |   | 4/1998  | Bhore et al. ................ 423/244    |

(Continued)

FOREIGN PATENT DOCUMENTS

| EP | 1013603 A1    | 6/2000 | ............. C01B/3/40 |
| GB | 1003147       | 9/1965 |                         |
| JP | 61028451      | 2/1986 |                         |
| WO | WO 00/06295 A1 | 2/2000 | ............. C01B/3/38 |
| WO | WO 01/12540 A1 | 2/2001 | ............. C01B/3/38 |

OTHER PUBLICATIONS

International Search Report from PCT/US 02/04479 (mailed Oct. 2002).

(Continued)

Primary Examiner—Cam N. Nguyen
(74) Attorney, Agent, or Firm—Frank Rosenberg; Todd J. Harrington

(57) ABSTRACT

A method of steam reforming a hydrocarbon over a spinel-containing catalyst at short residence times or short contact times. The present invention also provides spinel-containing catalysts. Surprisingly superior results and properties obtained in methods and catalysts of the present invention are also described.

27 Claims, 7 Drawing Sheets

Experimental Set-up

U.S. PATENT DOCUMENTS

| | | | | |
|---|---|---|---|---|
| 5,874,175 A | * | 2/1999 | Li | 428/457 |
| 6,245,303 B1 | | 6/2001 | Bentley et al. | 422/193 |
| 6,440,895 B1 | * | 8/2002 | Tonkovich et al. | 502/439 |
| 6,479,428 B1 | * | 11/2002 | Tonkovich et al. | 502/302 |
| 6,491,880 B1 | * | 12/2002 | Wang et al. | 422/211 |

OTHER PUBLICATIONS

Written Opinion from PCT/US 02/04479 (mailed May 2003).

Claridge et al., "New Catalysts for the Conversion of Methane to Synthesis Gas: Molybdenum and Tungsten Carbide." J. Catal. 180, 85–100 (1998).

Leonov, et al., "Monolithic Catalyst Supports With Foam Structure," React. Kinet. Catal. Lett., 60, 259–267 (1997).

Twigg et al., "Metal and Coated–Metal Catalysts," 59–87.

* cited by examiner

CATALYST AND METHOD OF STEAM REFORMING

RELATED APPLICATIONS

This application is a divisional of U.S. Ser. No. 09/788,293, filed Feb. 16, 2001, now U.S. Pat. No. 6,607,678, which was a continuation-in-part of U.S. patent application Ser. Nos. 09/375,615, filed Aug. 17, 1999, now U.S. Pat. No. 6,284,217, 09/640,903 (filed Aug. 16, 2000), and U.S. Pat. No. 09/375,614 (filed Aug. 17, 1999), now U.S. Pat. No. 6,488,838, all of which are incorporated herein as if reproduced in full below.

FIELD OF THE INVENTION

The present invention relates to catalysts and methods of steam reforming of a hydrocarbon.

BACKGROUND OF THE INVENTION

Steam reforming of hydrocarbons is commonly used for feedstock production for carbon-monoxide hydrogenation (Fischer-Tropsch synthesis), methanol synthesis and hydrogen production. Steam reforming is done commercially by flowing a mixture of steam and the hydrocarbon past a supported catalyst having an alumina support and a catalyst metal thereon, and reacting the mixture at a temperature from about 600° C. to about 1000° C., forming at least one product. Research has been done with the catalyst metal on many types of supports, including a spinel support. Residence times for conventional processes are typically on the order of seconds and steam to carbon ratio greater than about 2.5. For steam to carbon ratio less than 2.5, catalyst activity is generally degraded after hours to days due to coke formation and the supported catalyst must be refreshed or replaced.

The rate of supported catalyst activity degradation has been reduced in conventional processes by use of excess steam (steam to carbon ratio greater than 2.5). Excess steam, however, requires excess thermal energy and may result in a large system pressure drop. Using less steam results in faster degradation of catalyst activity because of coking from the hydrocarbon(s).

Hence, there is a need for a method of steam reforming of a hydrocarbon that provides greater product yield and permits using less steam and maintaining catalytic activity of the catalyst.

SUMMARY OF THE INVENTION

The present invention provides a method of steam reforming, comprising: passing steam and hydrocarbon through a reaction chamber; wherein the reaction chamber comprises a spinel-containing catalyst that has surface active sites comprising a material selected from the group consisting of rhodium, iridium, nickel, palladium, platinum, ruthenium, carbide of group VIb and combinations thereof; wherein the rate of passing steam and hydrocarbon is controlled such that residence time in the reaction chamber is less than 0.1 seconds; wherein the temperature in the reaction chamber is in the range of 500° C. to 1000° C.; and wherein, after passing through the reaction chamber, at least 60% of the hydrocarbon has been converted to products after passing through the reaction chamber. "Converted to products" simply means that the hydrocarbon has been reacted and changed its chemical formula (e.g., methane has been converted to CO and hydrogen).

The invention also provides a catalyst, that includes: (a) a first porous structure with a first pore surface area and a first pore size of at least about 0.1 $\mu$m; (b) a porous interfacial layer that comprises a spinel with a second pore surface area and a second pore size less than said first pore size, said porous interfacial layer having a thickness less than 4 mm disposed upon said porous structure; and (c) a steam reforming catalyst that contains rhodium, iridium, nickel, palladium, platinum, ruthenium, carbide of group VIb and/or combinations thereof disposed upon the second pore surface area.

The invention also provides a catalyst that includes: an alumina layer; a metal exposed on the surface of the catalyst; and a spinel layer disposed between the alumina layer and the metal. The spine layer is in direct contact with the alumina layer, and the metal includes a metal selected from the group consisting of: rhodium, iridium, nickel, platinum, palladium, and ruthenium. By "exposed on the surface" it is meant that the metal would be exposed to reactant gases that contact the catalyst; the metal can be located inside pores and crevices as well as the very exterior of the catalyst.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
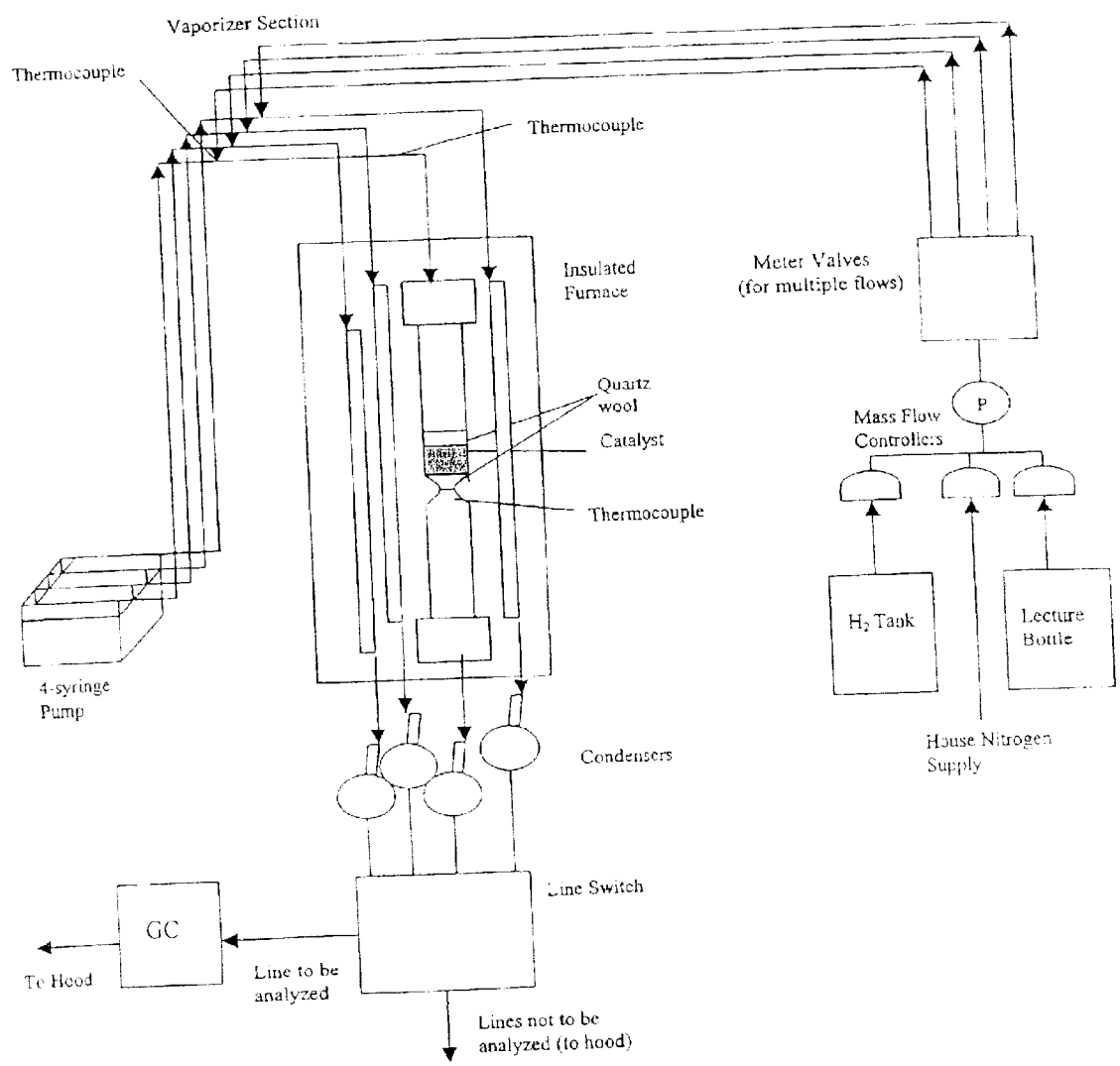
FIG. 1 is a schematic drawing of catalyst testing apparatus.

The catalyst requires catalytically active surface sites that reduce the kinetic barrier to the steam reforming reaction. Preferably the catalyst for surface-exposed sites comprise one or more of the following: ruthenium, rhodium, iridium, nickel, palladium, platinum, and carbide of group VIb. Rhodium is particularly preferred.

The catalyst also contains a spinel. Spinels are a well-known class of hard, thermally stable materials. See, for example, the description of spinels in Wells, "Structural Inorganic Chemistry," 5th ed. 1987 pp. 592–596, 318.5. The spinel preferably has the formula $MgAl_2O_4$, although in practice it is expected that small (e.g., 5%) compositional differences may be present. The spinel, including the presence of catalytically active surface sites, as measured by BET, preferably has a volumetric average pore size of less than 0.1 micrometer ($\mu$m). The spinel, including the presence of catalytically active surface sites, as measured by BET, nitrogen physisorption, preferably has a surface area of more than 10 $m^2/g$, more preferably a surface area of 20 to 500 $m^2/g$. The spinel can be particles, preferably having diameters less than 4 mm, more preferably less than 1 mm, or, more preferably the spinel forms a layer (of agglomerated particles or a continuous film) having a thickness less than 4 mm, more preferably less than 1 mm, and still more preferably a thickness of less than 40 $\mu$m.

In preferred embodiments, the spinel layer is coated over, and preferably in direct contact with, a high surface area material such as alumina, preferably $\gamma$(gamma)-alumina. This configuration provides high surface area for good metal dispersion and/or high metal loadings and also provides a spinel layer for excellent stability and minimized surface acidity. The high surface area material is porous; thus, the meaning of a spinel "disposed over" or "coated over" a high surface area material means that the spinel may also coat crevices and cavities within the high surface area material (or the large pore size substrate where there is not an intervening layer).

The catalyst may take any conventional form such as a powder or pellet. In some preferred configurations, the catalyst includes an underlying large pore support. Examples of preferred large pore supports include commercially available metal foams and, more preferably, metal felts. Prior to depositing the alumina (if present), spinel and surface-exposed catalyst, the large pore support has a porosity of at least 5%, more preferably 30 to 99%, and still more preferably 70 to 98%. Preferably, the support has a volumetric average pore size, as measured by BET, of 0.1 $\mu$m or greater, more preferably between 1 and 500 $\mu$m. Preferred forms of porous supports are foams and felts and these are preferably made of a thermally stable and conductive material, preferably a metal such as stainless steel or FeCrAlY alloy. These porous supports are preferably thin, such as between 0.1 and 1 mm. Foams are continuous structures with continuous walls defining pores throughout the structure. Felts are fibers with interstitial spaces between fibers and includes tangled strands like steel wool. Various supports and support configurations are described in U.S. patent applications Ser. No. 09/640,903 (filed Aug. 16, 2000), U.S. Pat. No. 6,680,044 which is incorporated by reference.

The catalyst with a large pore support (and including the spinel-supported catalyst) preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

In one embodiment, the large-pore substrate has a corrugated shape that could be placed in a reaction chamber (preferably a small channel) of a steam reformer.

The catalysts are stable and resistant to coke formation. In preferred embodiments, the catalyst has less than a 5% decline in hydrocarbon conversion after 40 hours of methane steam reforming at a steam to carbon ratio of 1, a contact time of 27 msec, less than 1 psig, and 900° C. In another preferred embodiment, the catalyst does not show reduced hydrocarbon conversion after 1000 hours of steam reforming at a steam to carbon ratio of 3, a contact time of 20 msec, 120 psig, and 850° C. Preferably, no coke formation is observed under the same conditions.

In one method of making a catalyst, a high surface area powder, such as alumina, is impregnated with a soluble magnesium solution. The resulting material is dried and calcined. In some preferred embodiments, either (1) less than 0.5 mole Mg is added per mole of Al, or (2) the calcinations treatment is sufficiently low temperature or short such that not all of the alumina is converted to spinel. In the second method, a layer of magnesia will remain over the spinel. Following spinel formation, a catalytically active material is deposited, dried, calcined and activated.

When an underlying, large-pore substrate is used, the above-described powder could be slurry coated over the substrate at any stage in the preparative process. For example, the particles, after calcinations to form the spinel, could be slurry coated onto the substrate followed by depositing, drying and activating a metal via the impregnation method. Alternatively, a vapor coat or soluble form of alumina (or other high surface area material) could be applied onto the substrate prior to spinel formation. Although solution or slurry coating is typically less expensive, vapor coating of the various materials could also be employed.

The present invention also provides methods of steam reforming in which a hydrocarbon is reacted with water vapor at short residence (short contact) times over a spinel-containing catalyst such as the catalysts described above. The residence time is preferably less than 0.1 s. Short contact times are preferably 5–100 milliseconds (msec), more preferably 10–25 msec.

Hydrocarbons are: alkanes, alkenes, alkynes, aromatics, and combinations thereof including fuels such as gasoline, kerosine, diesel, JP-8. Preferably, the hydrocarbon is an alkane or a fuel. Preferred alkanes are $C_1$–$C_{10}$ alkanes, such as methane, ethane, propane, butane, and isooctane.

The steam reforming reaction is preferably carried out at 500–1000° C., more preferably 650–900° C. The reaction can be run over a broad pressure range from sub-ambient to very high. A methane steam reforming reaction run over the inventive catalyst at 120 psi, $H_2O/C$ ratio of 1, 25 ms contact time, and 900° C., showed no coke formation and no change in CO selectivity after 7 hours of continuous reaction.

Certain aspects of the invention can best be described in terms of properties such as conversion and selectivity. In preferred embodiments, the catalyst, when tested at short contact (or residence) times in the apparatus schematically illustrated in FIG. 1, or equivalent apparatus, shows good hydrocarbon conversions and good selectivities.

Both the catalysts and methods can be characterized by hydrocarbon conversions and selectivities. Hydrocarbon conversion is preferably at least 50%, more preferably at least 90% and still more preferably at least 95%. Hydrogen selectivity, defined as moles H atoms in $H_2$ in the product gas divided by moles H in all product gases, is preferably at least 50%, more preferably at least 60%, still more preferably at least 85%, and yet still more preferably at least 95%. For some embodiments, carbon monoxide selectivity is preferably less than 65%, more preferably less than 40%.

Preferred embodiments of the inventive catalysts and methods may also be described in terms of their exceptionally high hydrogen productivity per catalyst volume. Preferably, the catalyst (per cubic centimeter of volume) has a hydrogen productivity of at least 0.7 mmol·s$^{-1}$·cm$^{-3}$ when run at the above-described short contact times. In some embodiments, the catalysts and methods have a productivity of between 0.5 and 2 mmol·s$^{-1}$·cm$^{-3}$ at short contact times.

EXAMPLE 1

The supported catalyst was spinel of a gamma-alumina ($\gamma$-Al$_2$O$_3$) support with a magnesia (MgO) passivation layer and rhodium oxide (Rh$_2$O$_3$). The approximate composition was about 15 wt % Rh$_2$O$_3$, about 5 wt % MgO, and about 80 wt % $\gamma$-Al$_2$O$_3$. The supported catalyst was prepared by (1) calcining a high surface area $\gamma$-Al$_2$O$_3$ at 500° C. for 5 hours; (2) impregnating the $\gamma$-Al$_2$O$_3$ with MgO using the incipient wetness technique with a solution of magnesium nitrate; and obtaining an MgO modified $\gamma$-Al$_2$O$_3$ support; (3) drying the modified support at 110° C. for 4 hours followed by (4) a second calcination at 900° C. for 2 hours; (5) impregnating the modified support with Rh$_2$O$_3$ with the incipent wetness technique from a rhodium nitrate solution; (6) followed by a final drying 110° C. for 4 hours and a (7) a final calcination at 500° C. for 3 hours to obtain a powder of the supported catalyst.

A microreactor was constructed of a quartz tube with 4 mm inner diameter (ID) and 6.35 mm outer diameter (OD). About 0.2 g of powder of supported catalyst (70–100 mesh) was placed in the microreactor in a packed bed arrangement. Prior to catalyst evaluation, catalyst was activated in 10% H$_2$/N$_2$ (100 cc(STP)/min) at 110° C. for four hours.

A series of tests were run for various hydrocarbons over the catalyst described above. The hydrocarbons included methane, butane, isooctane, synthetic crude, gasoline, diesel, and JP-8. Conversions of 60% or greater were observed in each case. Results and conditions are tabulated below.

| Hydro-carbon | Furnace T (° C.) | P (atm) | contact time (s) | residence time (s) | conv. (%) | select H$_2$ (%) | select CO (%) | H$_2$ prod. (mmol/s/cc) |
|---|---|---|---|---|---|---|---|---|
| methane | 885 | 1 | 0.025 | 0.025 | 99 | 100 | 62 | 1.33 |
| butane | 600 | 1 | 0.025 | 0.011 | 100 | 61 | 11 | 0.75 |
| iso-octane | 650 | 1 | 0.025 | 0.011 | 100 | 87 | 40 | 1.06 |
| syn crude | 575 | 1 | 0.05 | 0.024 | 100 | 88 | 27 | 0.53 |
| gasoline | 650 | 1 | 0.025 | 0.011 | 60 | 100 | 21 | 0.73 |
| diesel | 650 | 1 | 0.025 | 0.011 | 93 | 100 | 36 | 1.12 |
| JP-8 | 650 | 1 | 0.025 | 0.011 | 95 | 78 | 28 | 0.90 |

Figure 2:
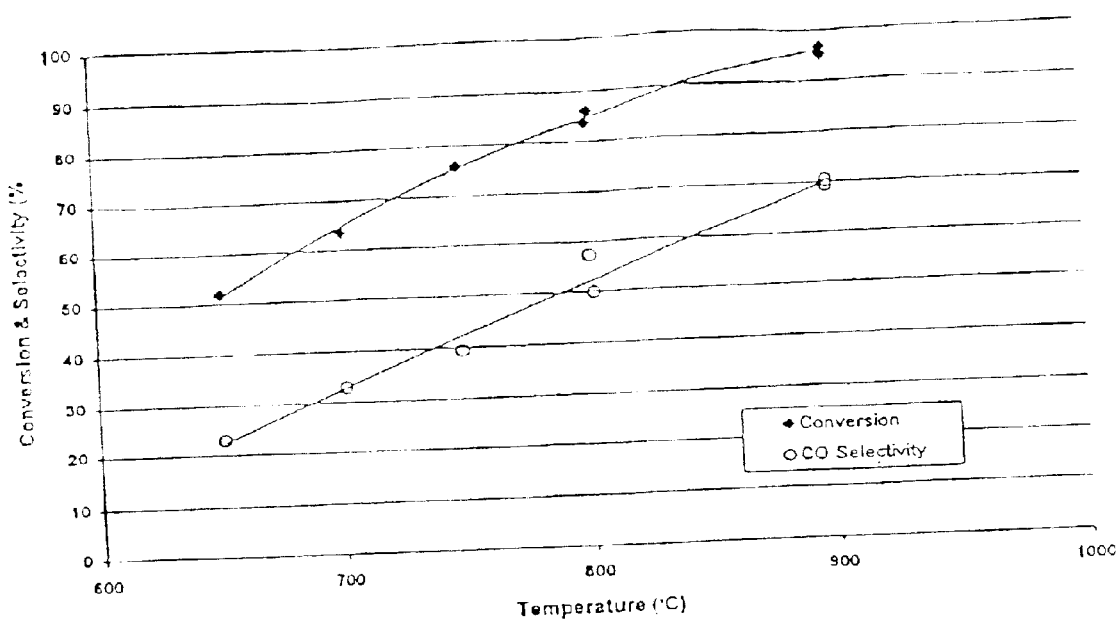
FIG. 2 is a graph of conversion and selectivity versus furnace temperature for methane steam reforming over a spinel-supported powder catalyst at a 25 millisecond contact time.

Results are shown in FIG. 2 for a steam to carbon ratio of 3 and a contact time of 25 msec with conversion ranging from about 52% to 95% with increasing temperature and CO selectivity ranging from 22% to 70%.

Figure 3:
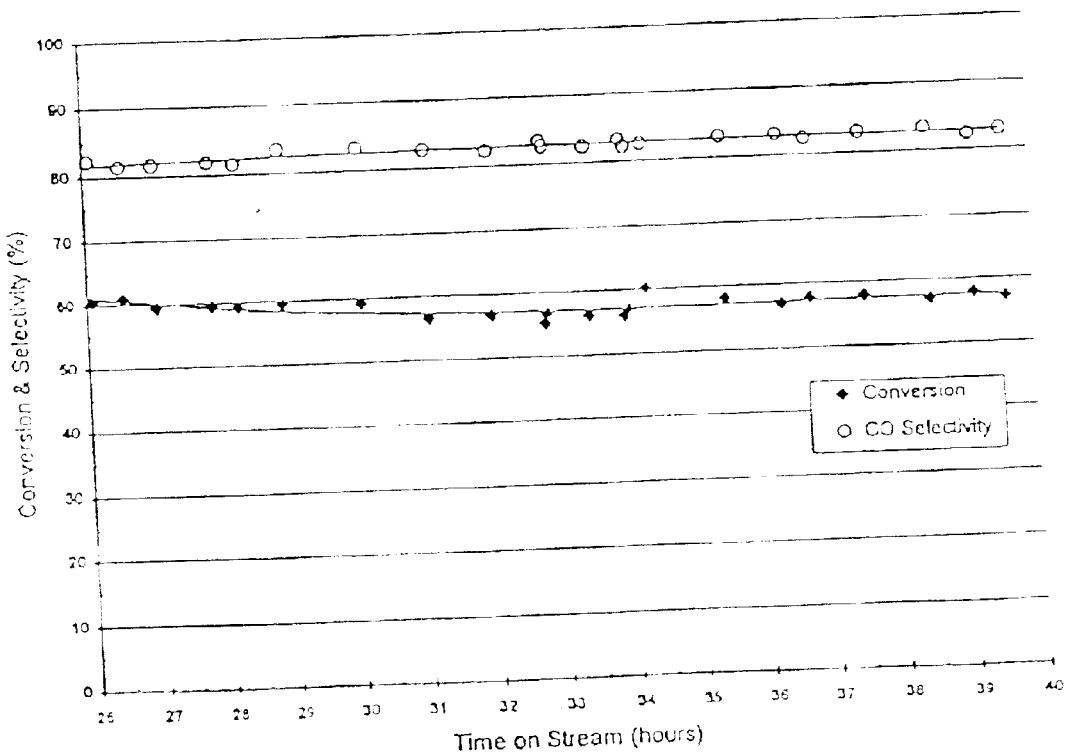
FIG. 3 is a graph of conversion and selectivity versus time for methane steam reforming over a spinel-supported powder catalyst at a 25 millisecond contact time.

Results in FIG. 3 are for a steam to carbon ratio of 1 and a contact time of 25 msec for a methane steam reforming reaction run at 900 ° C. over 40 hours. No degradation of the supported catalyst was observed. Electron microscopic examination after testing revealed no coke deposition and BET measurements detected no significant loss in surface area. Similar testing with a contact time of 27 msec and steam to carbon ratios varying from 3:1 to 1:1 also showed no catalyst degradation after 42 hours and 9 thermal cycles.

A test over the above-described catalyst was conducted for a steam to carbon ratio of 3 and a contact time of 20 msec for a methane steam reforming reaction run at 850° C. and 120 psig (pounds per square inch gauge) over 1000 hours. Initial methane conversion was 87% and final methane conversion was 92% with initial CO selectivity of 60% and final CO selectivity of 70%. Thus, there was excellent catalyst stability (no degradation of conversion %) even after 1000 hours operation at a steam-to-carbon ratio of 3.

Figure 4:
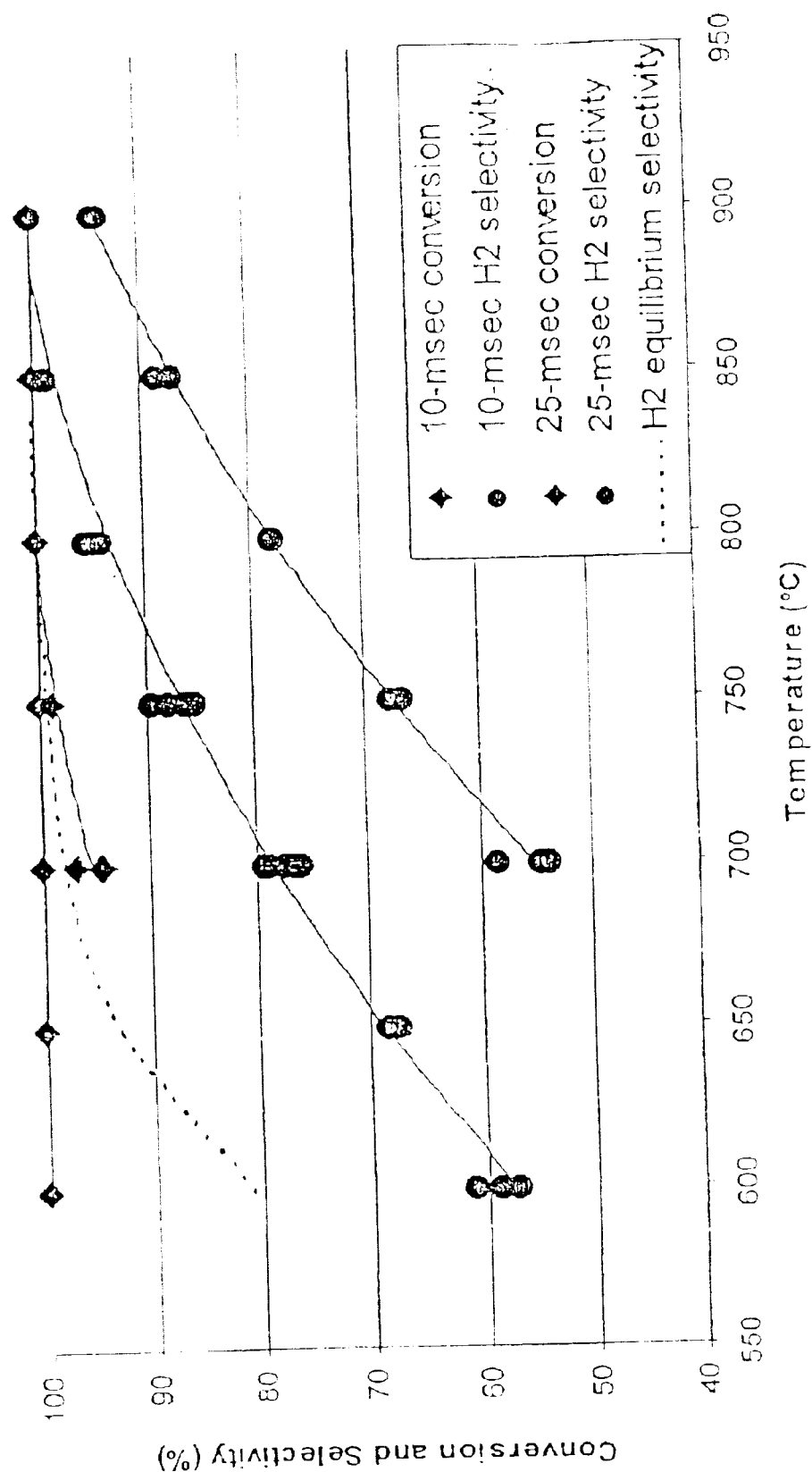
FIG. 4 is a graph of conversion and $H_2$ selectivity versus furnace temperature for butane steam reforming over a spine-supported powder catalyst at 10 and 25 millisecond contact times.

The results of steam reforming of butane at 10 and 25 msec over the catalyst of this Example are shown in FIG. 4. The lower sets of curves are for the 10 msec contact times. As can be seen from the figure, the invention can achieve near maximum butane conversion with about 95% conversion or greater at temperatures near 700° C. Hydrogen selectivity is also good with greater than 50 to 100% selectivity occurring at temperatures near 700° C.

Figure 5:
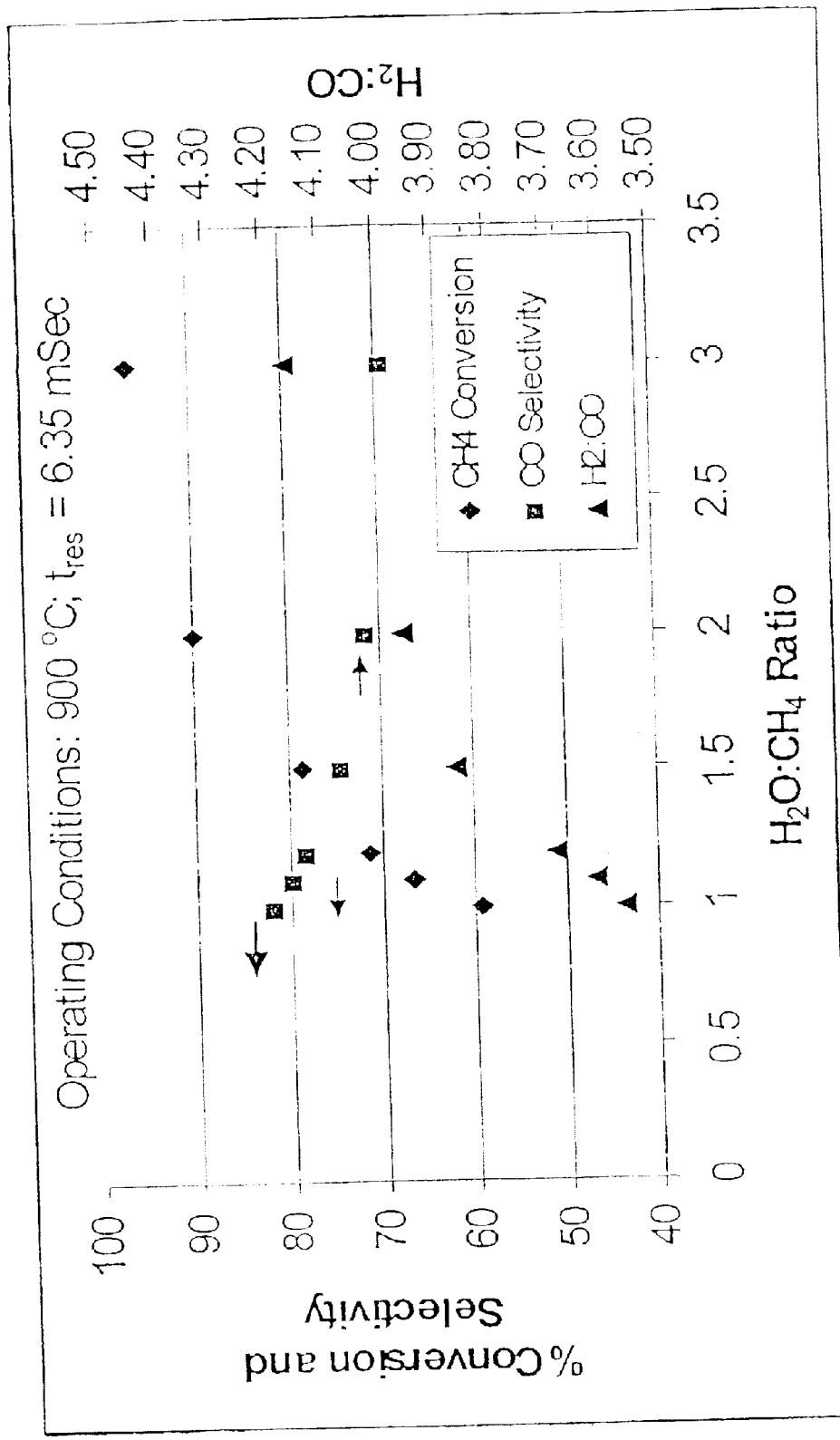
FIG. 5 is a graph of conversion and CO selectivity versus steam to carbon ratio for methane steam reforming over a spinel-supported powder catalyst at a 6.35 millisecond residence (27 ms contact) time.

As shown in FIG. 5, for methane steam reforming, increasing steam to carbon ratio increases conversion and decreases CO selectivity.

EXAMPLE 2

Engineered Catalysts

Porous engineered catalysts were prepared to contain a catalyst of 13.8% —Rh/6% —MgO/Al$_2$O$_3$ on a metal felt of FeCrAlY alloy (the alloy was obtained from Technetics, Deland, Fla). 13.8 wt % Rh6 wt % MgO/Al$_2$O$_3$ powdered catalyst was prepared by 1) calcining a high surface area gamma-alumina at 500° C. for 5 hours; 2) impregnating the gamma alumina with MgO using the incipient wetness method with an aqueous solution of magnesium nitrate; and obtaining an MgO modified gamma alumina support; 3) drying the modified support at 110° C. for 4 hours followed by 4) a second calcination at 900° C. for 2 hours; 5) impregnating the modified support with Rh$_2$O$_3$ with the incipient wetness method from a rhodium nitrate solution; 6) followed by a final drying at 110 C. for 4 hours and a 7) final calcinations at 500° C. for 3 hours to obtain a powder of the supported catalyst. The powdered catalyst was ball-milled overnight and slurry dip-coated on the FeCrAlY felt until the desired loading is achieved. The coated catalyst was dried at 90° C. overnight and calcined at 350° C. for four hours. Prior to the catalyst evaluation, catalyst was reduced in 10%H$_2$/N$_2$ (100 cc(STP)/min) at 110° C. for four hours.

All experiments were conducted to demonstrate the present invention using 1 microchannel for methane steam reforming. The microchannel was placed within a tube furnace to provide the required endothermic reaction heat. The catalyst "DF" consists of two single felts. Both felt catalysts have the identical dimensions (0.01'×0.35'×2'), and were evaluated in a single channel device (0.03'×0.35'×2'/ 0.075 cm×0.88 cm×5.0 cm). Two felts with a gap of about 0.01' were placed in the single channel device so that both felts were in close contact with the walls. The catalyst chamber volume is defined as the single channel volume (0.03'×0.35'×2'/0.075 cm×0.88 cm×5.0 cm).

The catalyst "C" was configured as follows. Felt with a thickness of 0.01' (0.025 cm) was crimped into a corrugated form, and is called a ruffle. Ruffles studied in this work have a fixed wave length of 0.117' (0.295 cm) and a fixed amplitude of 0.05' (0.127 cm). The dimensions of ruffle are 0.35' (0.88 cm) in width and 2' (8.0 cm) length. Reactants flow in the direction perpendicular to the waves. A single ruffle was snug-fitted into a single channel device (0.05'× 0.35'×2'), which confines the catalyst chamber volume. The catalyst "DC" has a double ruffle configuration, which is designed by stacking two identical ruffles with a shim (0.01'×0.35'×2'/0.025 cm×0.88 cm×5.0 cm) in between. The double ruffle was evaluated in a wider single channel device (0.11'×0.35'×2'/0.28 cm×0.88 cm×5.0 cm), which confines the catalyst chamber volume.

Figure 6:
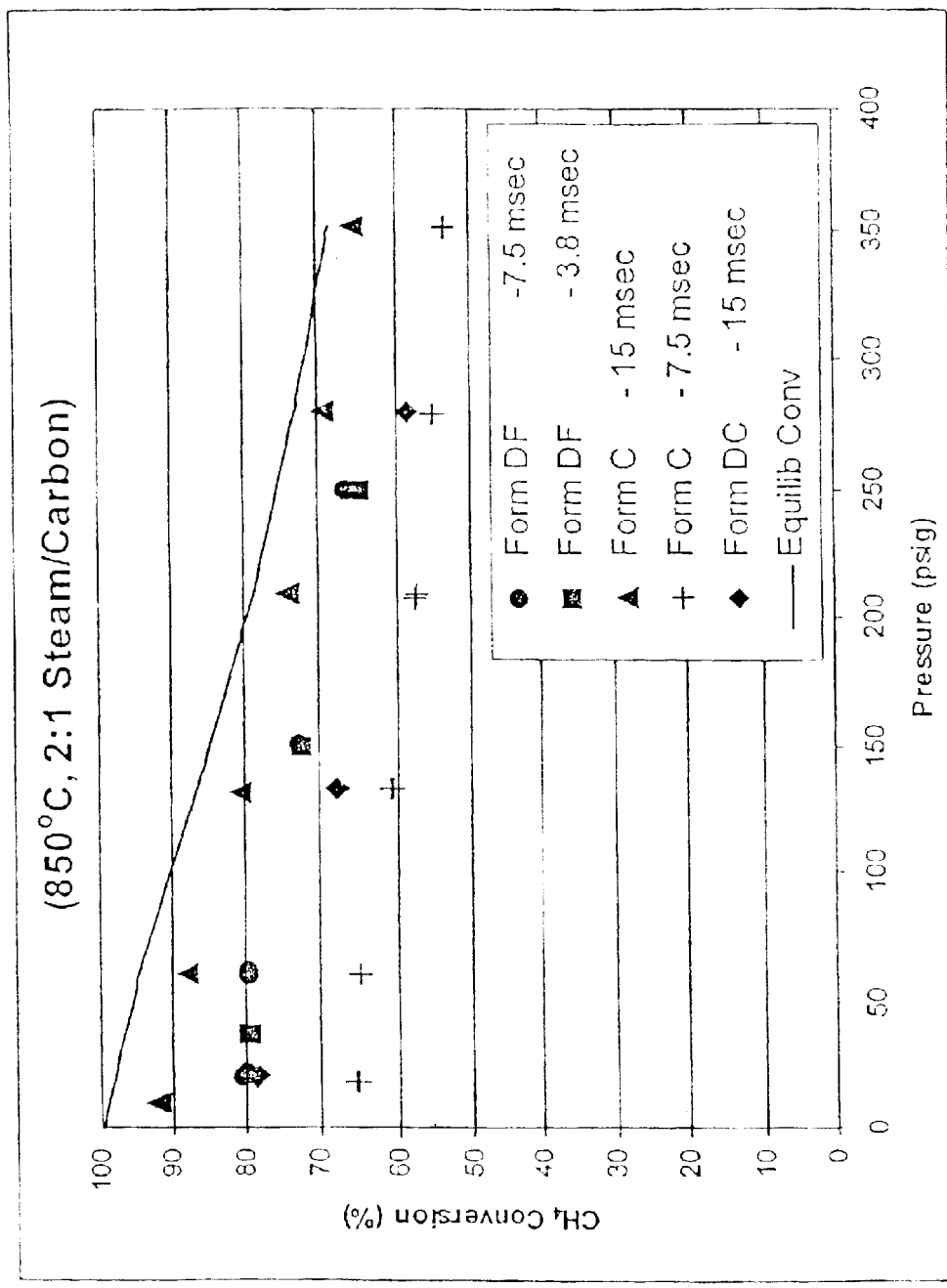
FIG. 6 is a graph of conversion versus pressure for methane steam reforming over a spinel-supported engineered catalyst at various contact times.
Figure 7:
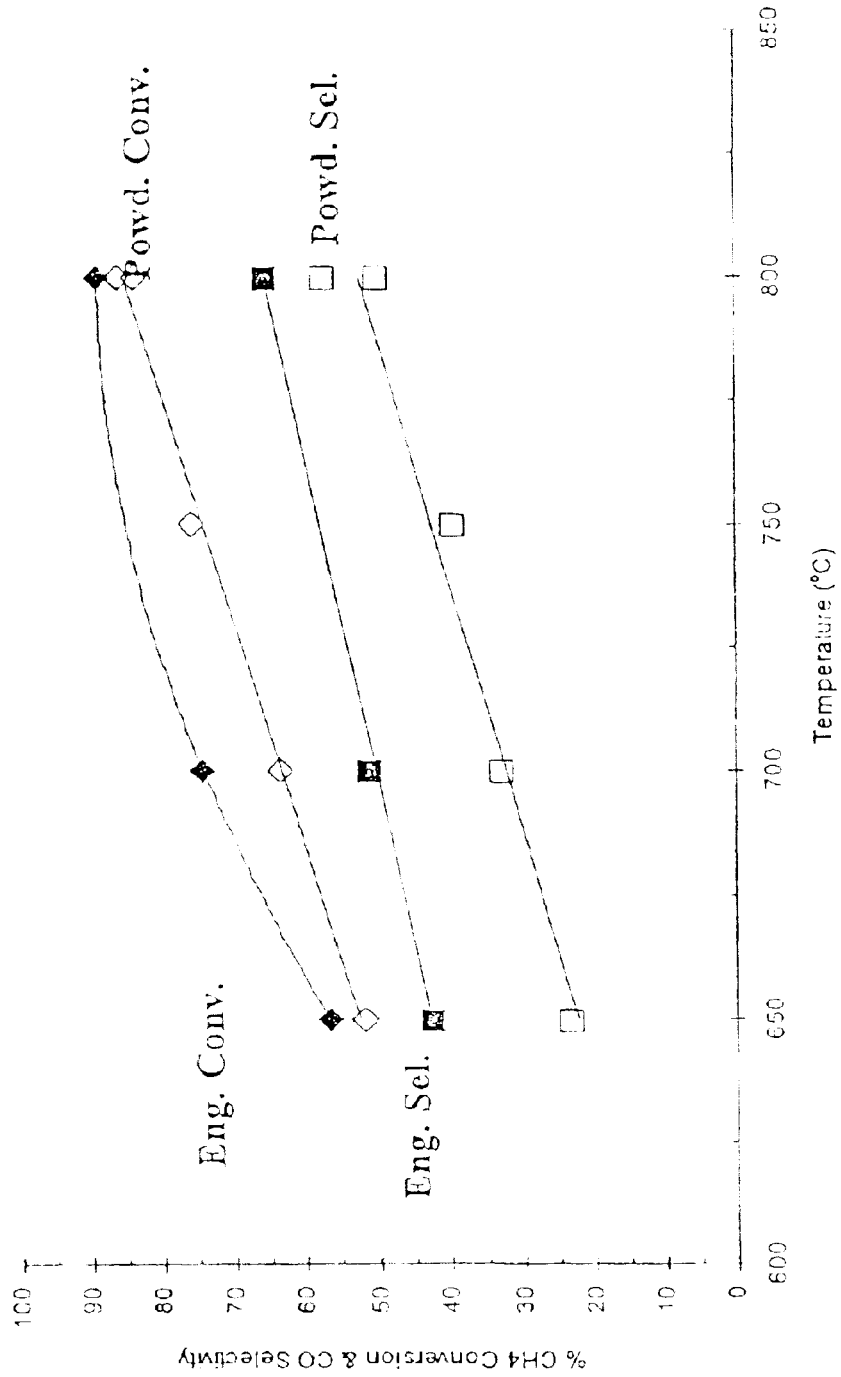
FIG. 7 is a graph of conversion and CO selectivity versus temperature comparing the engineered catalyst versus the same powder catalyst at the same conditions.
Figure 8:
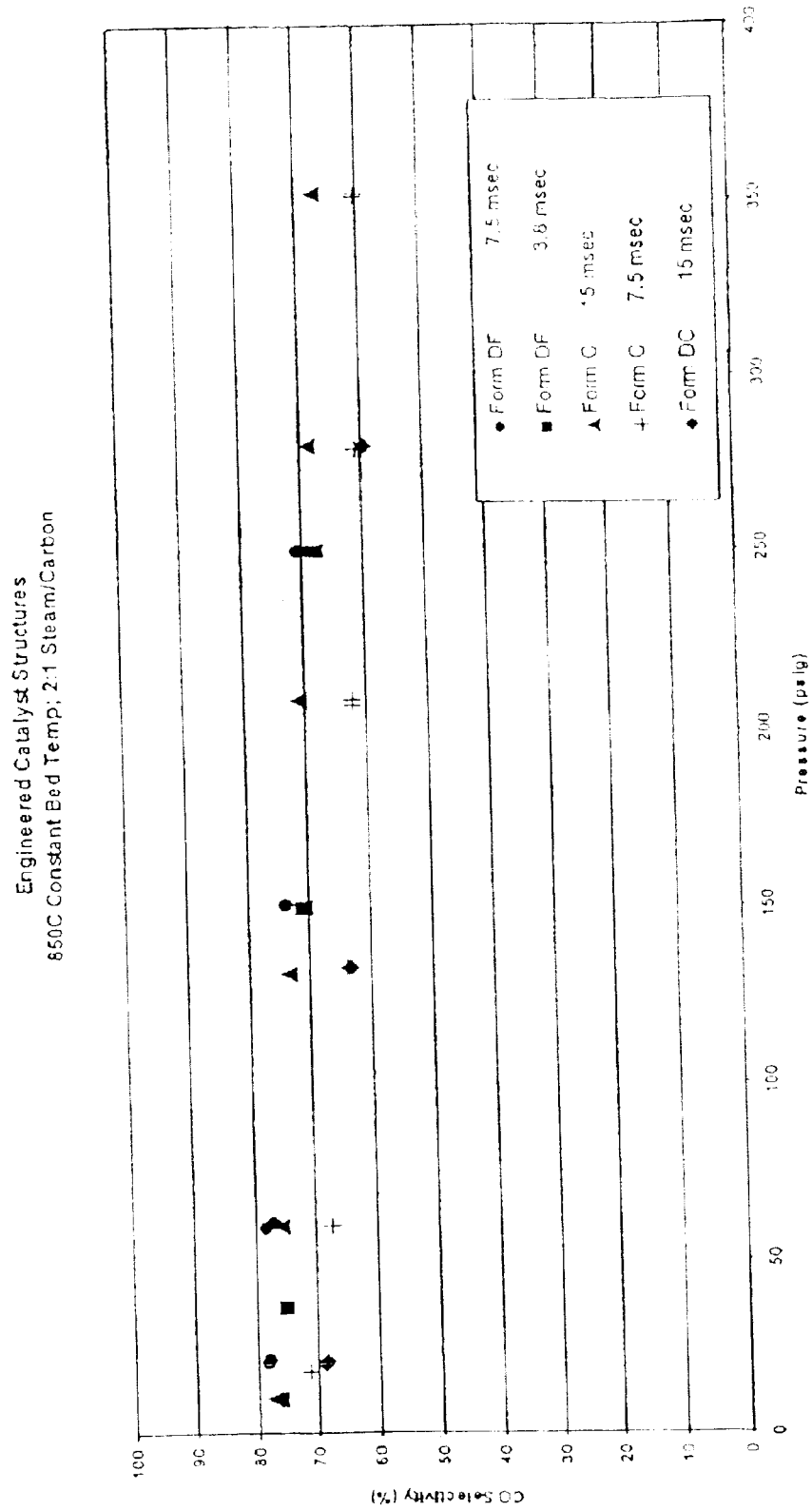
FIG. 8 is a graph of CO selectivity versus pressure for engineered catalysts at various contact times.

Results of steam reforming using the engineered catalysts is shown in FIGS. 6–8. The corrugated forms converted less methane, perhaps because of poorer heat transfer and/or less amount of catalyst within a fixed catalyst bed. Poorer heat transfer can result in relatively lower average catalyst temperature which results in lower CO selectivity as confirmed by the fact that the corrugated forms exhibited a lower CO selectivity. As can be seen in the figures, the catalyst supported on the large pore support (i.e., the engineered catalyst) exhibited the best performance (highest conversion). This surprising superiority of the engineered catalyst over the powder form could not have been predicted based on the published literature.

Closure

While preferred embodiments of the present invention have been described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A catalyst, comprising:
   (a) a first porous structure comprising a first pore surface area and a first pore size of at least about 0.1 $\mu$m;
   (b) a porous interfacial layer that comprises a spinel comprising a second pore surface area and a second pore size less than said first pore size, wherein said porous interfacial layer has a thickness less than 4 mm disposed upon said porous structure;
   (c) a steam reforming catalyst selected from the group consisting of rhodium, iridium, nickel, palladium, platinum, ruthenium, carbide of group VIb and combinations thereof disposed upon the second pore surface area.

2. The catalyst as recited in claim 1, wherein said steam reforming catalyst is selected from the group consisting of tungsten carbide, molybdenum carbide and combination thereof.

3. The catalyst of claim 1 wherein the first porous structure comprises a metal foam or felt.

4. The catalyst of claim 3 wherein the catalyst has a pore volume of 30–95%, and wherein at least 50% of the pore volume is in the range of 0.3 to 200 microns.

5. The catalyst of claim 3 wherein the catalyst has a pore volume of 30 to 95% and at least 50% of the catalysts pore volume is composed of pores in the size range of 0.1 to 300 microns.

6. The catalyst of claim 3 wherein the catalyst comprises a steam reforming catalyst selected from the group consisting of rhodium, iridium, nickel, and combinations thereof disposed upon the second pore surface area.

7. The catalyst of claim 6 wherein the spinel has the formula $MgAl_2O_4$.

8. The catalyst of claim 1 wherein the steam reforming catalyst comprises tungsten carbide.

9. The catalyst of claim 1 wherein the catalyst has a pore volume of 30 to 95% and at least 20% of the catalyst's pore volume is composed of pores in the size range of 1 to 100 microns.

10. The catalyst of claim 6 wherein the spinel layer has a thickness of less than 40 microns.

11. The catalyst of claim 1 comprising at least about 12 weight percent of rhodium, iridium, nickel, palladium, platinum, ruthenium, and combinations thereof.

12. The catalyst of claim 1 comprising at least about 12 weight percent of rhodium.

13. The catalyst of claim 1 wherein the porous interfacial layer consists essentially of a spinel, and wherein the spinel has a surface area of more than 10 $m^2/g$.

14. A catalyst comprising:
   an alumina layer;
   a metal exposed on the surface of the catalyst;
   a spinel layer disposed between the alumina layer and the metal;
   wherein the spinel layer is in direct contact with the alumina layer; and wherein the metal comprises a metal selected from the group consisting of: rhodium, iridium, nickel, platinum, palladium, and ruthenium; and
   wherein the spinel layer has a thickness of less than 40 microns.

15. The catalyst of claim 14 wherein the alumina layer comprises an alumina coating on a porous metal substrate.

16. The catalyst of claim 14 further comprising a magnesia layer; wherein the spinel layer is disposed between the magnesia layer and the alumina layer and said metal is disposed on the magnesia layer.

17. The catalyst of claim 14 wherein the catalyst does not show reduced hydrocarbon conversion after 1000 hours of steam reforming at a steam to methane ratio of 3, a contact time of 20 msec, a pressure of 120 psig, and a temperature of 850° C.

18. The catalyst of claim 14 wherein the spinel layer has a surface area of 20–500 $m^2/g$.

19. The catalyst of claim 18 wherein the spinel has the formula $MgAl_2O_4$.

20. The catalyst of claim 14 wherein the alumina layer comprises gamma alumina.

21. The catalyst of claim 14 wherein the metal comprises Rh.

22. The catalyst of claim 14 comprising of at least about 12 weight percent of rhodium, iridium, nickel, palladium, platinum, ruthenium, and combinations thereof.

23. The catalyst of claim 14 comprising at least about 12 weight percent of rhodium.

24. The catalyst of claim 23 wherein the catalyst provides a methane conversion of at least 95% and a hydrogen selectivity of at least 95% after testing with a steam to methane ratio of 3, at a contact time of 25 msec and a temperature of 900° C.

25. The catalyst of claim 14 wherein the catalyst provides a methane conversion of at least 50% after testing for 40 hours with a steam to methane ratio of 1, at a contact time of 25 msec and a temperature of 900° C.

26. The catalyst of claim 14 wherein the catalyst has a pore volume of 5 to 98% and at least 20% of the catalyst's pore volume is composed of pores in the size range of 0.1 to 300 microns.

27. A catalyst comprising:
   an alumina layer;
   a metal exposed on the surface of the catalyst;
   a spinel layer disposed between the alumina layer and the metal;
   wherein the spinel layer is in direct contact with the alumina layer; and
   wherein the metal comprises a metal selected from the group consisting of rhodium iridium, nickel, platinum, palladium, and ruthenium; and
   further comprising a magnesia layer wherein the spinel layer is disposed between the magnesia layer and the alumina layer and said metal is disposed on the magnesia layer.

* * * * *